(12) United States Patent
Nelms et al.

(10) Patent No.: US 7,402,041 B2
(45) Date of Patent: Jul. 22, 2008

(54) MOTION SIMULATING DEVICE

(75) Inventors: Michael Craig Nelms, Spotsylvania, VA (US); Raymond Charles Gordon, Spotsylvania, VA (US); Lester Best, Jr., Manassas, VA (US)

(73) Assignee: KB3, Inc., Spotsylvania, VA (US)

( * ) Notice: Subject to any disclaimer, the term of this patent is extended or adjusted under 35 U.S.C. 154(b) by 420 days.

(21) Appl. No.: 11/284,903

(22) Filed: Nov. 23, 2005

(65) Prior Publication Data

US 2007/0117068 A1  May 24, 2007

(51) Int. Cl.
G09B 19/16 (2006.01)

(52) U.S. Cl. ....................................................... 434/55

(58) Field of Classification Search .................. 434/29, 434/55, 58, 61, 62, 63, 67, 69, 71; 472/59, 472/60, 130
See application file for complete search history.

(56) References Cited

U.S. PATENT DOCUMENTS

| | | | |
|---|---|---|---|
| 5,857,986 A | 1/1999 | Moriyasu | 601/49 |
| 5,947,825 A | 9/1999 | Horstmann et al. | 463/42 |
| 5,951,018 A | 9/1999 | Mamitsu | 273/442 |
| 5,954,508 A | 9/1999 | Lo et al. | 434/55 |
| 6,017,276 A | 1/2000 | Elson et al. | 472/60 |
| 6,283,757 B1 | 9/2001 | Meghnot et al. | 434/33 |
| 6,315,673 B1 | 11/2001 | Kopera et al. | 472/60 |
| 6,371,853 B1 | 4/2002 | Borta | 463/36 |
| 2002/0115043 A1 | 8/2002 | Baker et al. | 434/30 |
| 2003/0006982 A1 | 1/2003 | Yokoyama et al. | 345/419 |

*Primary Examiner*—Kurt Fernstrom
(74) *Attorney, Agent, or Firm*—Nath Law Group; Jerald L. Meyer; Derek Richmond (57) ABSTRACT

Disclosed is a motion simulating device that includes a first scissor jack having a helical screw and a motor that rotates the helical screw of the scissor jack thereby raising or lowering the first scissor jack. Also included is a second scissor jack also having a helical screw and a motor that rotates the helical screw thereby raising or lowering the second scissor jack. At least one platform can be connected to the first and second scissor jacks. A controller is in communication with the first and second motors so that rotation of the helical screws of the first and second scissor jacks raises or lowers the scissor jacks thereby moving the platform up and down in accordance with movement of the scissor jacks. The controller can be a joystick, a steering wheel, foot pedals, a voice trigger, a gear shifter, roller ball, or any other device capable of translating mechanical energy into an electrical signal. The motion simulating device can also include at least one additional controller.

20 Claims, 11 Drawing Sheets

MOTION SIMULATING DEVICE

FIELD OF THE INVENTION

The present invention relates generally to video games and, more particularly, to an inexpensive motion simulator that adds realism to a video game experience.

BACKGROUND OF THE INVENTION

Motion simulator systems are widely used for a variety of entertainment applications as well as military and commercial training applications. For example, pilots are often trained in a motion simulator rather than in an actual aircraft and military tank crews are provided with a simulator that, from the occupants' perspective, has the feel of a tank rumbling across a variety of terrain. The portion of the system devoted to generating motion, the motion simulator, typically includes a motion base, which moves in response to motion control commands provided from a computer or embedded in the video signal. When a person is positioned on the motion base, the person is moved in accordance with movement of the motion base while receiving visual and audio stimuli. This combination of motion, visual, and auditory sensation generates a very realistic physical sensation that is far superior to merely seeing and hearing an audio/visual presentation while remaining stationary. Unfortunately, due to the expense of these motion simulator systems, use is generally limited to military and commercial training applications. Further, the weight and complexity of the mechanical portion of such simulators preclude any use in a home or similar environment.

A motion simulator used in a home entertainment system adds a very real physical sensation to what is otherwise a solely audio/visual experience. Although a motion simulator system is often viewed as an enhancement to a viewing experience, relatively few such systems are found in entertainment complexes such as movie theaters or video arcades because of complexity and high cost. It follows that even fewer motion simulator systems are found in private homes to be used in conjunction with a video game or other entertainment system.

Traditionally, video games are played by standing or sitting at a stationary video game machine that generally includes a video display and controls. Typically, the video display is stationary with respect to the player. Moveable video game seats have been introduced in an arcade environment in an attempt to simulate movements of a vehicle appearing on the video display, thereby adding a degree of realism to the video game experience. These seats, however, are typically moved by hydraulics and are thus costly to mass produce. Also, the cost of these types of seats makes home use cost prohibitive. Another hindrance to home use of a hydraulically lifted seat is the potential for leaks in the hydraulic system, which could ruin a floor or other interior of a home.

Motion for simulators used for arcade applications are is typically obtained from several servo motors coupled to the motion base. In some applications, up to eight such servo motors are required. Unfortunately, servo motors are heavy and relatively expensive. Due to the high acquisition price there is only a limited market for arcade-style motion simulator systems. It should be apparent that regardless of the application, a substantial portion of the cost of the above described motion simulator systems resides in the mechanism that drives the motion base. Further, the high cost renders it impractical to use prior art motion simulator systems in the home or similar environment.

Another drawback of prior art motion simulator systems resides in the weight of the system and power requirements to drive the motion base. These parameters render motion simulator systems unfit for home use. What is needed is a lightweight motion simulator system that is inexpensive but that is well suited for use in the home or similar environment. However, since safety of the user is required, a lightweight motion simulator must also be sufficiently stable without relying on the heavy servo and gearbox combination of the prior art.

With the advent of Internet gaming, the addition of motion would enhance the gaming experience for the home user. With a safe, low cost, lightweight motion simulator system, the gaming experience at home would approach the environment found in military or commercial training or high-end arcade applications. What is needed is an inexpensive and reliable motion simulator that is adapted for use in a home or similar environment that can be easily coupled to a home computer or other entertainment device, such as the television or stereo.

Accordingly, there is a need for an inexpensive motion simulator that adds a high degree of realism to a video game experience and that can be used in a home.

SUMMARY OF INVENTIVE ASPECTS

Disclosed herein is a motion simulating device. Embodiments of the motion simulating device generally include a first scissor jack having a first helical screw. The helical screw is rotated by a motor, which can be a linear or a rotating motor, which raises or lowers the first scissor jack. An additional second scissor jack, also having a helical screw, is included in the motion simulating device. A second motor, which can also be a linear or a rotating motor, rotates the helical screw of the second scissor jack thereby raising or lowering the second scissor jack.

The first and second scissor jacks support at least one platform. At least one controller, which can be any mechanism designed to translate mechanical motion into electrical signals such as a joystick, a steering wheel, gear shifter, a foot pedal, a voice activated controller, or some combination of these items, is in communication with the scissor jacks. Applying mechanical motion to the controller causes the scissor jacks to raise or lower, independently of each other, thereby raising or lowering each scissor jack's respective side of the platform.

Raising or lowering of the first scissor jack of the motion simulating device tilts the platform about a first axis and raising or lowering of the second scissor jack tilts the platform about a second axis. Although not required, both axes can be perpendicular to each other in the plane of the platform. Whatever the orientation of the axes, each scissor jack continuously adjusts an angle of the platform about its respective axis so that the platform is provided with motion in accordance with a viewpoint of a scene appearing on the visual display.

A further aspect of the motion simulating device includes at least one visual display connectable to the controller through a visual display connector. The controller controls movement in a scene appearing on the visual display.

Some variations of the embodiments of the motion simulating device will require a connector for connecting the motion simulating device to an external system such as a video game system, an entertainment system, or a system containing a vehicle training program. The connector can be an adapter for making the motion simulating device adaptable to a plurality of external systems.

Other variations of the motion simulating device include a passenger compartment. The passenger compartment will either rest on top of the platform moving in accordance therewith, or it will completely surround the motion simulating device thereby primarily serving to seal off the user from extraneous stimuli such as light and sound. Additionally, the motion simulating device can include an audio system including various speakers. The audio system can be used with or without a passenger compartment; however, using the audio system with a passenger compartment greatly enhances the simulation experience.

Additional platforms can be used in the motion simulating device. In some instances, a user might want all platforms to be in synchronization with each other, for example, when the motion simulating device is being used to watch a movie where all people are viewing the screen from a first person perspective. In other instances, one platform can operate independently of the other platforms. For example, if two or more people are playing a car racing video game, each person will enjoy the game from a different perspective since the each person is controlling a different vehicle. The forces acting on the driver of one vehicle will be different that the forces acting on the driver of another vehicle.

A method of simulating motion within a scene appearing on a display comprises receiving an input having a magnitude in a controller. A primary signal corresponding to the input received by the controller is transmitted to a processor. The processor determines the amount of the magnitude of the primary signal and divides the signal into a first secondary signal and a second secondary signal. The first secondary signal is sent to the display, which, as a result, is updated to correspond to the amount of magnitude inputted into the controller. The second secondary signal is sent to a signal splitter. The signal splitter, which is connected to the scissor jacks, divides the second secondary signal into yet two additional signals—a first tertiary signal and a second tertiary signal. The first tertiary signal is sent to the first scissor jack and causes it to raise or lower and the second tertiary signal is sent to the second scissor jack and causes the second scissor jack to raise or lower.

The method of simulating motion of a scene appearing on a display can also include the step of receiving an external input from an external system, such as a Sony® PlayStation®, Microsoft® Xbox®, or some other game system that is designed to update a display in a manner independent of a user's input signal. The external system updates both the scene appearing on the display and also provides a signal relating to the update to the signal splitter which is then transmitted to the scissor jacks. Each of the external systems that the present inventive system connects with continuously updates the display screen such that a person viewing the screen while using the present inventive system will have to react to updates in the screen.

The processor can determine an amount of the magnitude of the input applied to the controller and, if applicable, can also determine a direction of force of the input. Either the same processor or a secondary processor can divide the input signal into at least two separate (secondary) signals.

The system of simulating motion of a scene appearing on a display can also comprise a means for receiving an external input from an external system, which allows the present inventive system to be used with a plurality of gaming systems as well as a plurality of training simulators. In particular, the means is typically a special adapter, like that mentioned above, which is used to attach the inventive system to an external training or entertainment system such as an X box®, a PlayStation®, a vehicle operation simulation program or some other system.

DETAILED DESCRIPTION

Figure 1:
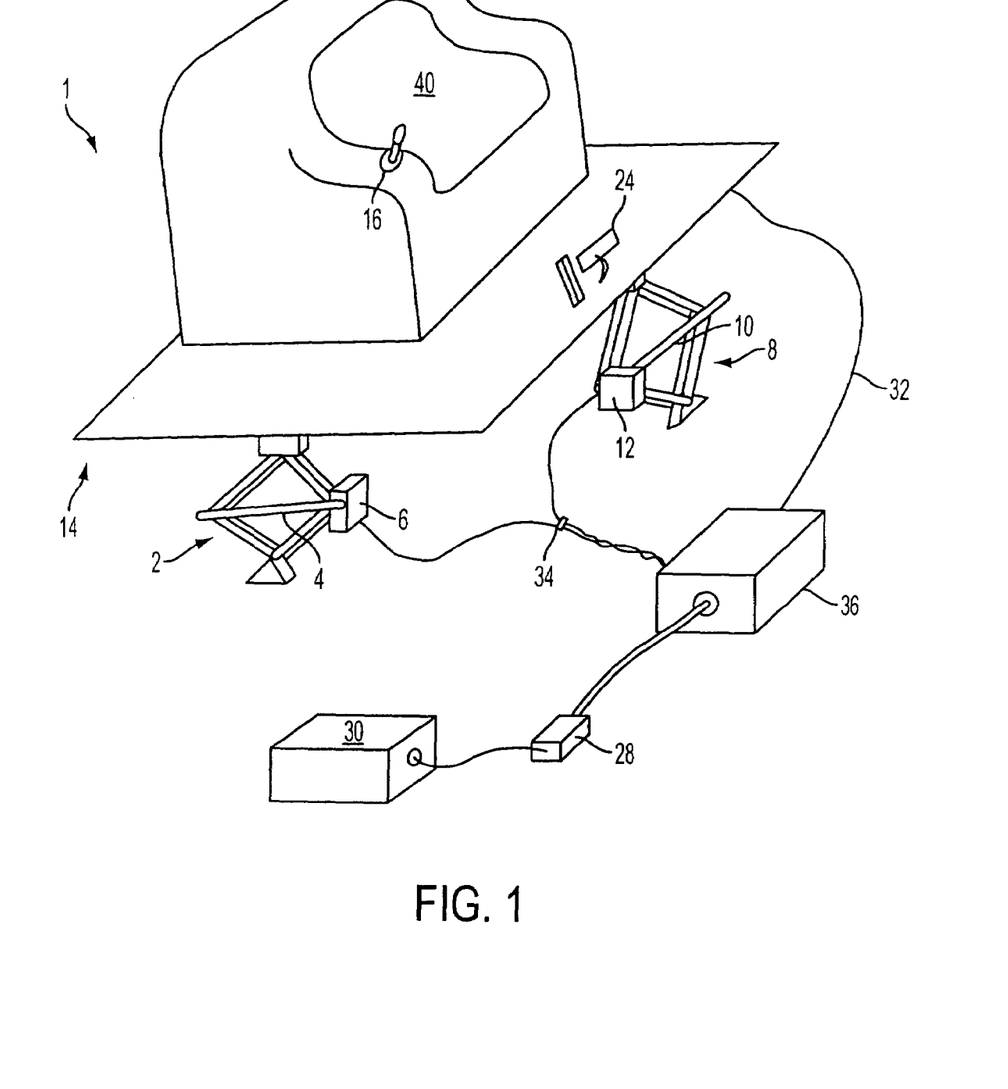
FIG. 1 is a perspective view of the inventive motion simulating device.

With reference to FIG. 1, an embodiment of the inventive motion simulating device 1 includes a first scissor jack 2 having a first helical screw 4. A first motor 6, located on one end of the first helical screw 4, rotates the first helical screw 4 thereby raising or lowering the first scissor jack 2. The motion simulating device also has a second scissor jack 8 having a second helical screw 10. A second motor 12, located on one end of the second helical screw 10 rotates the second helical screw 10 thereby raising or lowering the second scissor jack 8. A base (shown in FIG. 1 as a platform 14), having a seat 40 is connected to the top of the first scissor jack 2 and to the top of the second scissor jack 8. Raising or lowering of the first scissor jack tilts said platform 14 about a first axis and raising or lowering of said second scissor jack tilts said platform 14 about a second axis, which should, but does not necessarily have to, be perpendicular to the first axis. Embodiments of the base of the present invention are not limited to a platform 14; the base can be any unit capable of imparting simulated motion to a person.

A controller 16 is positioned somewhere near or on the seat 40 in a way that it is easily accessible to a user. Through a transmission line 32, the controller 16 is in indirect communication with the first motor 6 and the second motor 12 so that rotation of the first helical screw 4 raises or lowers the first scissor jack 2 thereby moving the platform 14 and rotation of the second helical screw 10 raises or lowers the second scissor jack 8 moving the platform 14. The connection is indirect because the controller 16 first connects to a motor controller 36 through the controller transmission line 32 and then connects to the scissor jack motors 6 and 12 through signal splitter 34. It is noted that, in some embodiments of the invention, the controller is in direct communication with the motors.

The first motor 6 and the second motor 12 can both be linear motors or, alternatively, the first motor 6 and the second motor 12 can both be rotating motors. An additional alternative is the combination of a rotating motor for use as either the first motor or the second motor and a linear motor for use as the other motor. Also, motors 6 and 12 can be removed and the helical screws 4 and 10 can be replaced with linear motors, thereby reducing the number of moving parts of the system, reducing the weight of the system and eliminating the potential for wear and tear on a helical screw.

Another alternative to this embodiment of the motion simulating device is one in which a linear motor is used in lieu of each of the scissor jacks. The linear motor can be directly attached to the platform thereby providing the necessary tilt and vibration to the platform. One of the advantages to using a linear motor in lieu of a scissor jack is that there are fewer moving parts in the system, thereby making the system even lighter and less costly to assemble.

Figure 2:
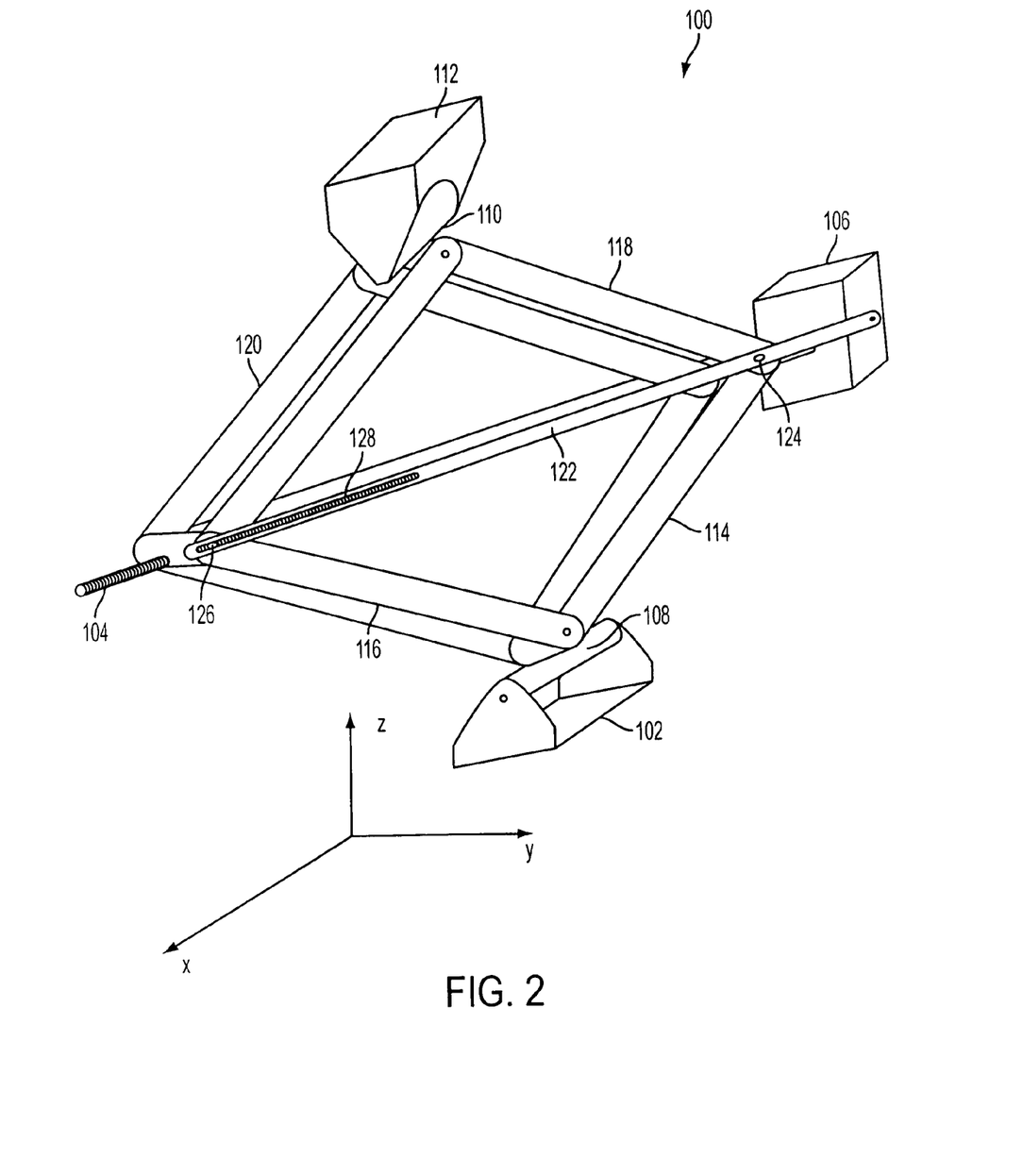
FIG. 2 is a perspective view of a scissor jack.

As shown with more particularity in FIG. 2, an exemplary scissor jack 100 is comprised of a foot 102, a helical screw 104, a motor 106 positioned at one end of the helical screw 104, a lower universal connector 108, an upper universal connector 110, a platform support bracket 112, four sets of linkages, 114, 116, 118 and 120, and at least one motor bracket 122. In operation, the motor 106 turns the helical screw 104 a number of revolutions that is sufficient enough to raise or lower the platform support bracket 112 the desired amount, which in turn raises or lowers the respective portion of the platform the desired amount. The motor bracket 122 prevents the motor 106 itself from turning when it applies rotary motion to the helical screw 104. The motor bracket 122 can be attached to any part of the motor 106 and any part of the scissor jack 100 such that rotational movement of the motor 106 about an axis parallel to helical screw 104 is kept stationary with respect to the scissor jack 100. In the embodiment shown in FIG. 2, the motor bracket 122 is attached to either or both sides of the motor 106. The motor bracket 122 is also attached to the scissor jack 100 at a first flex pin 124. The motor bracket 122 is attached to the scissor jack 100 at a second flex pin 126. In particular, the connection at the second flex pin 126 is between the second flex pin 126 and a motor bracket slot 128. This connection allows the second flex pin 126 to slide along the motor bracket 122 when the scissor jack 100 is being raised or lowered. Alternatively, a shorter motor bracket (not shown) can be used where the motor bracket is connected to the motor and to only one point on the scissor jack—for example, to flex pin 124.

As mentioned above, the scissor jack 100 is intended to be used with one additional scissor jack to raise and lower a respective portion of a platform about a respective axis. Whether a scissor jack is used in a motion simulating device or a linear motor is used instead of a scissor jack, a lower universal connector 108 and an upper universal connector 110 should be used. The reason is that motion occurs in all three axes for each of the scissor jacks used in the motion simulating device. A universal connector provides the scissor jack with the freedom to move in any direction.

Furthermore, in each of the embodiments of the present invention, two scissor jacks (or linear motors) are all that is required to properly operate the motion simulating device. However, for added stability, at least one additional set of scissor jacks can be added to the device. Each jack of the second set of scissor jacks should be positioned in opposition to the original set of scissor jacks. That way, a maximum amount of stability is provided to the platform.

Figure 3:
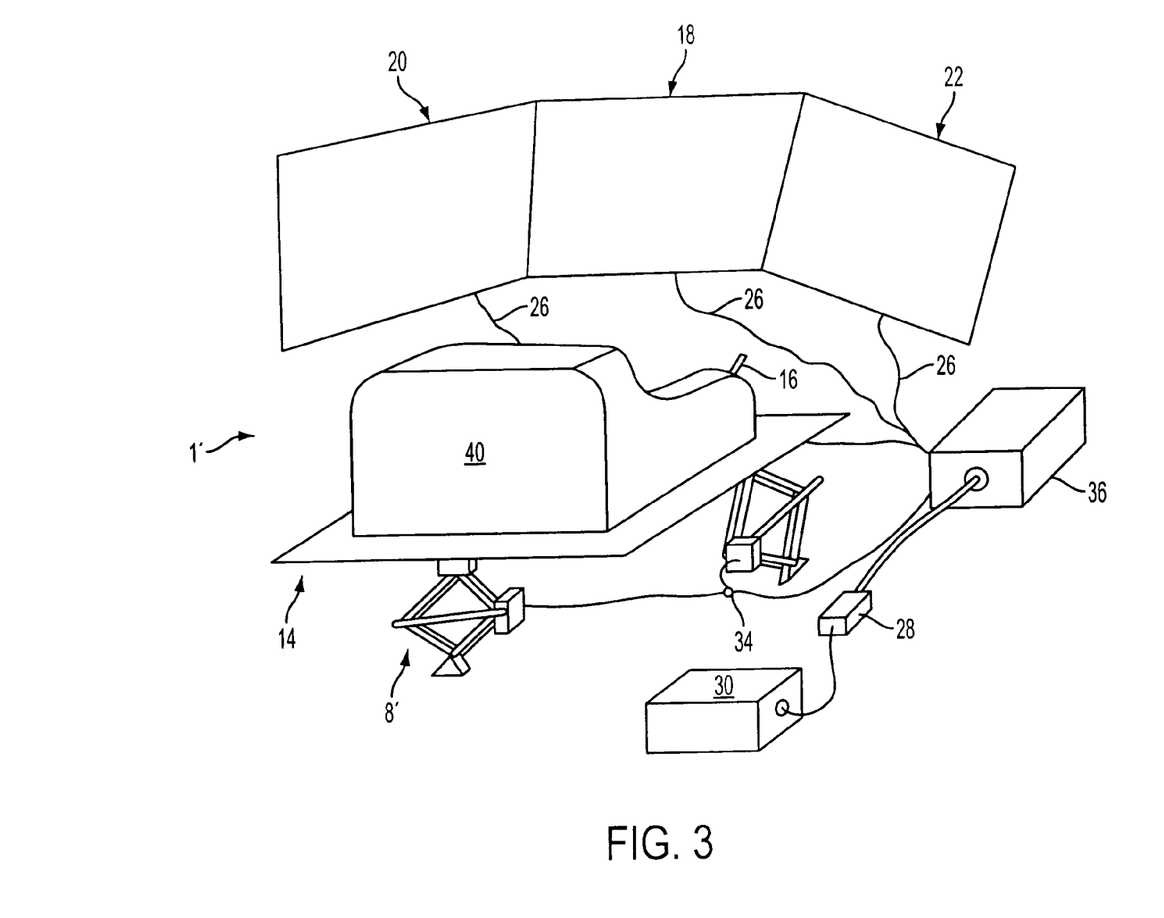
FIG. 3 is a perspective view of a motion simulating device connected to a plurality of display screens.

With reference to FIG. 3, included in this embodiment of the motion simulating device 1' is at least one visual display 18 connectable to the controller through a visual display connector 26 via a motor controller 36. By way of example, additional displays 20 and 22 can be included in this embodiment and are also connectable to the controller 16 through a visual display connector 26 and motor controller 36. However, the motion simulating device is not limited to one to three screens, as shown in FIG. 3, since even more displays can be provided around the motion simulating device 1' to provide a scene in all directions around the motion simulating device 1'. Through the motor controller 36, the controller 16 can control movement in a scene appearing on the visual display 18 and on the additional displays 22 and 24. In this manner, the motion simulating device 1' can be connected, through a connector 28 to an entertainment system 30 such as a video game system or some other system containing a program such as a pilot training program, a driver's training program, or any other motion simulation program. The connector 28 is typically going to be an adapter for making the motion simulating device adaptable to a plurality of entertainment systems and simulation programs.

Figure 4:
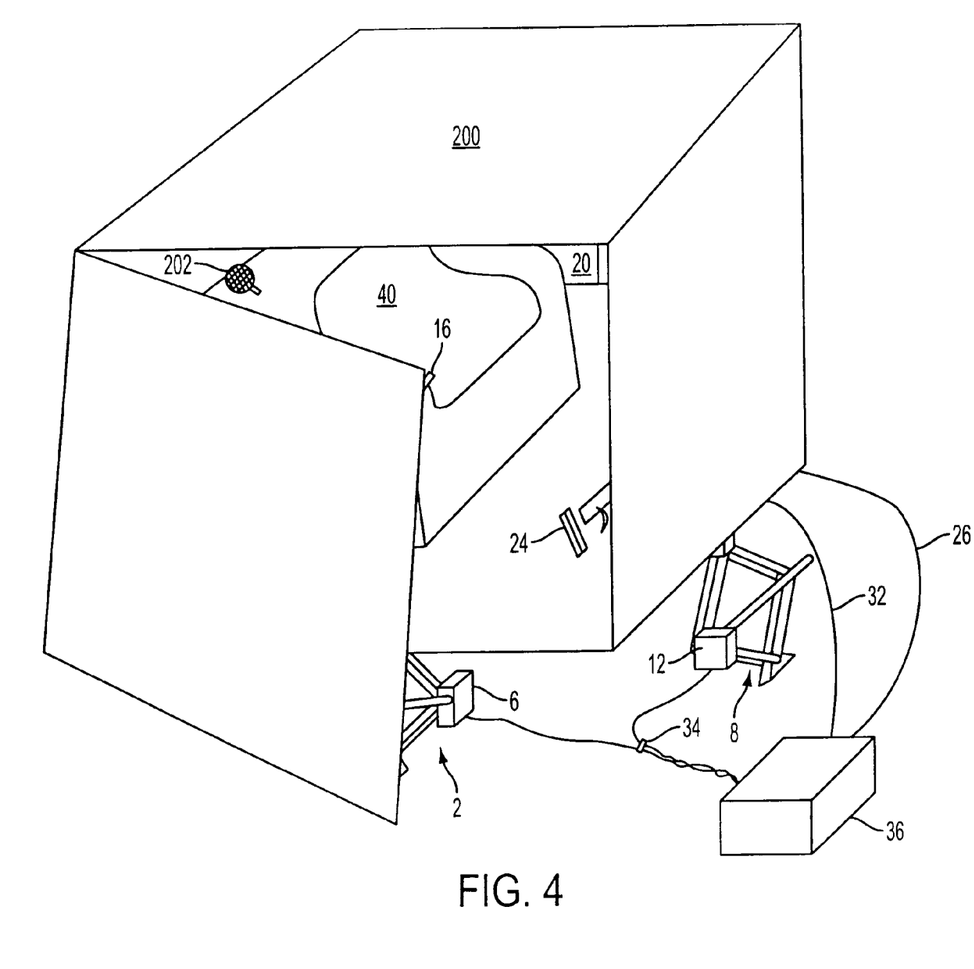
FIG. 4 depicts a perspective view of the inventive motion simulating device with a passenger compartment.

As shown in FIG. 4, the motion simulating device can include a passenger compartment 200. The passenger compartment 200 can be positioned in a resting position on top of the platform (not shown) or the passenger compartment 200 can be positioned in an active position. In the resting position, the motion of the passenger compartment 200 is dependent upon the motion of the platform; the passenger compartment 200 tilts in the same direction that the platform is tilting. In an active position, the passenger compartment 200, which includes screens on an inside thereof, moves independently of the platform. In this instance, movement of the passenger compartment 200 is separate from movement of the platform and, from the user's perspective, has the visual effect of adding secondary motion. The benefit to this is that, in video games and motion simulation programs involving water activities, for example, the visual effect to a person of waves rocking a watercraft can be simulated by movement of the passenger compartment, which will of course cause the display screen (shown in the figure as 20, but not limited to a single screen) to move, while movement of the watercraft will be simulated by the platform. In this case, it is advantageous but not necessary to seal the passenger compartment 200 such that a person inside the passenger compartment, as well as the visual display are visually sealed from outside light sources, thereby creating a virtual environment that is realistic to the user. In furtherance of this objective, the passenger compartment should include an audio system including speakers 202 positioned to provide a more realistic effect on the user.

An additional embodiment of the motion simulating device is one including at least one additional platform. Any number of platforms can be used. In this additional embodiment, the first platform can operate either in synchronization with or independently of the additional platform. Of course, a separate set of scissor jacks are used to provide motion to the additional platform. A second controller and a second connector that are dedicated to the second platform should be used. However, one display screen can be used for both platforms if, for example, two users are using the motion simulating device to watch a movie or television show; or a separate display screen can be used for each platform such that, for example, if two people are playing a video game or operating a simulator program where two perspectives are required, each person has a first person point-of-view.

Also disclosed herein is a method of simulating motion shown on a scene appearing on a display, which includes receiving an input in a controller. The input will have a certain magnitude. For example, if a person is using a motion simulating device as a flight simulator, lightly tapping the controller in a particular direction will cause the perspective of a screen to adjust less drastically than if a person applies more force on a controller. From the controller, a primary signal corresponding to the input direction and magnitude is transmitted to a processor. The processor then determines an amount of the magnitude of the input.

The signal is divided into a first secondary signal, which is sent to the display to update the scene, and a second secondary signal. With respect to the first secondary signal, in a video game scene, for example, the camera perspective of the game will be changed as a result of the first secondary signal received from the input controller. The scene will be updated in an amount corresponding to the direction and amount of the magnitude of the input. The second secondary signal is sent to a signal splitter to be further transmitted on to the scissor jack motors (or linear motors).

Because motion of the platform is governed by two scissor jacks, each scissor jack has to receive a signal that causes that particular jack to apply motion to the platform that corresponds to its respective component of motion received from the processor. Again, with reference to FIG. 1, when the second secondary signal is sent to the signal splitter 34, it is divided into a first tertiary signal and a second tertiary signal. The signal splitter 34 is connected to both of the scissor jacks 2 and 8. The first tertiary signal represents a magnitude and a Cartesian, polar, or spherical component of the first axis of the input signal; and the second tertiary signal represents a magnitude and a Cartesian, polar, or spherical component of the second axis of the input signal. The first tertiary signal is sent to the first motor 6, which controls the first scissor jack 2 and the second tertiary is sent to the second motor 12, which controls the second scissor jack 8. The first tertiary signal causes the first motor 6 to raise or lower the first scissor jack 2; and the second tertiary signal causes the second motor 12 to raise or lower the second scissor jack 8.

Often times, video game systems or motion simulators will apply external forces on the user that, in the real world, would cause the user to experience motion. For example, if the video game being played were a game involving driving a vehicle, the driver would experience motion if a second vehicle hit the driver's vehicle. This type of motion is not supplied by a person applying a magnitude to a controller but rather is controlled by a video game system independent of the user (or a motion simulation program). Therefore, the motor controller 36 can be configured to receive an external input from an external system 30 such as a game system or motion simulation program. The external system 30 will send a first external signal to the signal splitter 34 to be sent to the scissor jack motors 6 and 12 and sends a signal to the displays 18, 20 and 22 to update the scene in a manner independent of the input signal coming from the controller.

Yet an additional embodiment of the motion simulating device 502 can be seen in FIGS. 5-10. This embodiment of the motion simulating device includes a floor base 504. The floor base 504 is planar and is comprised of a frame 506, a first scissor jack support plate 508, outlined by the frame 506, supporting a first scissor jack 538, a second scissor jack support plate 510 (shown in FIG. 6), outlined by the frame 506, supporting a second scissor jack 540, a pedestal point post support plate 512, and a power supply support plate 536, outlined by the frame 506. The floor base 504 can be made of steel or aluminum and can include lockable casters (not shown) preferably on each of the corners of the base to allow easy movement of the motion simulating device 502 from one location to another. In furtherance of this objective, the base should be narrow enough to fit within a twenty-four inch throughway such as a doorway.

Figure 5:
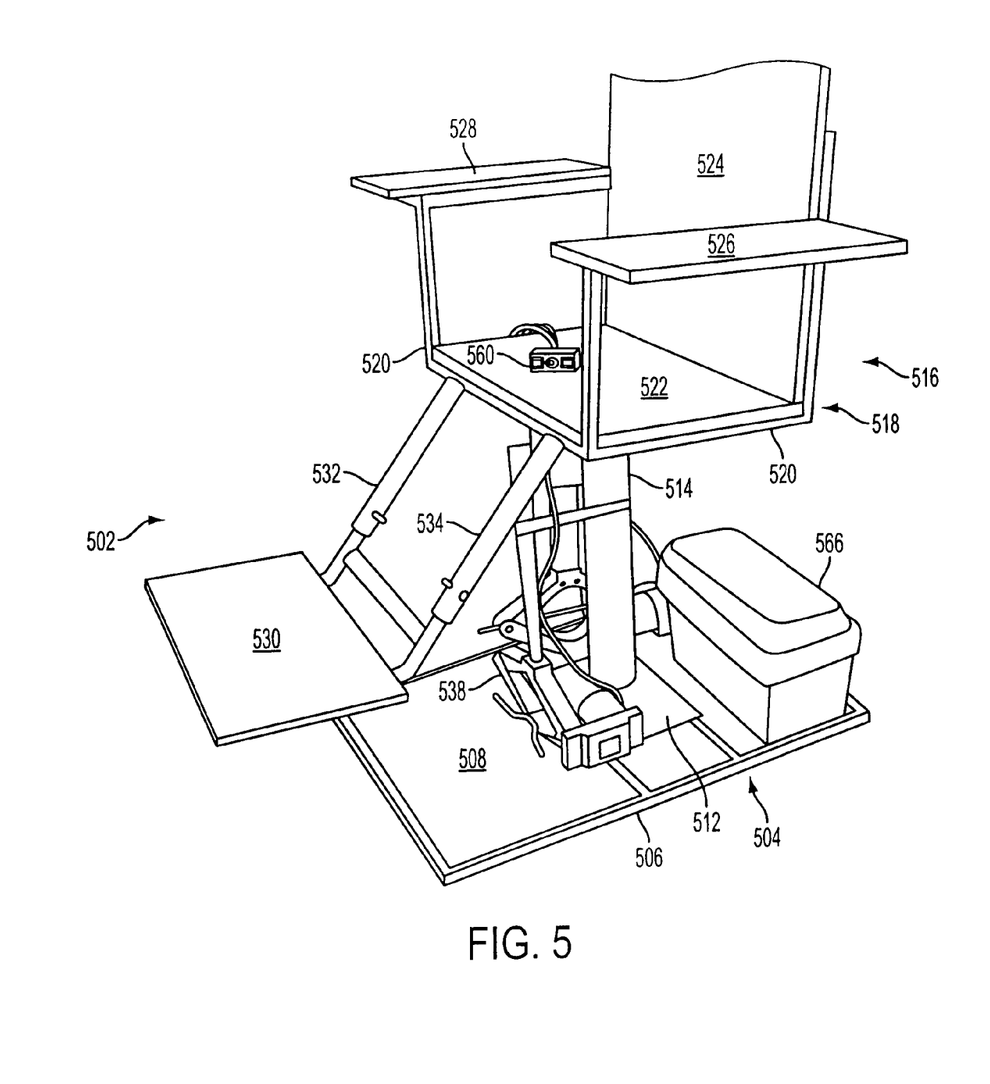
FIG. 5 shows a perspective view of an additional embodiment of the motion simulating device.
Figure 6:
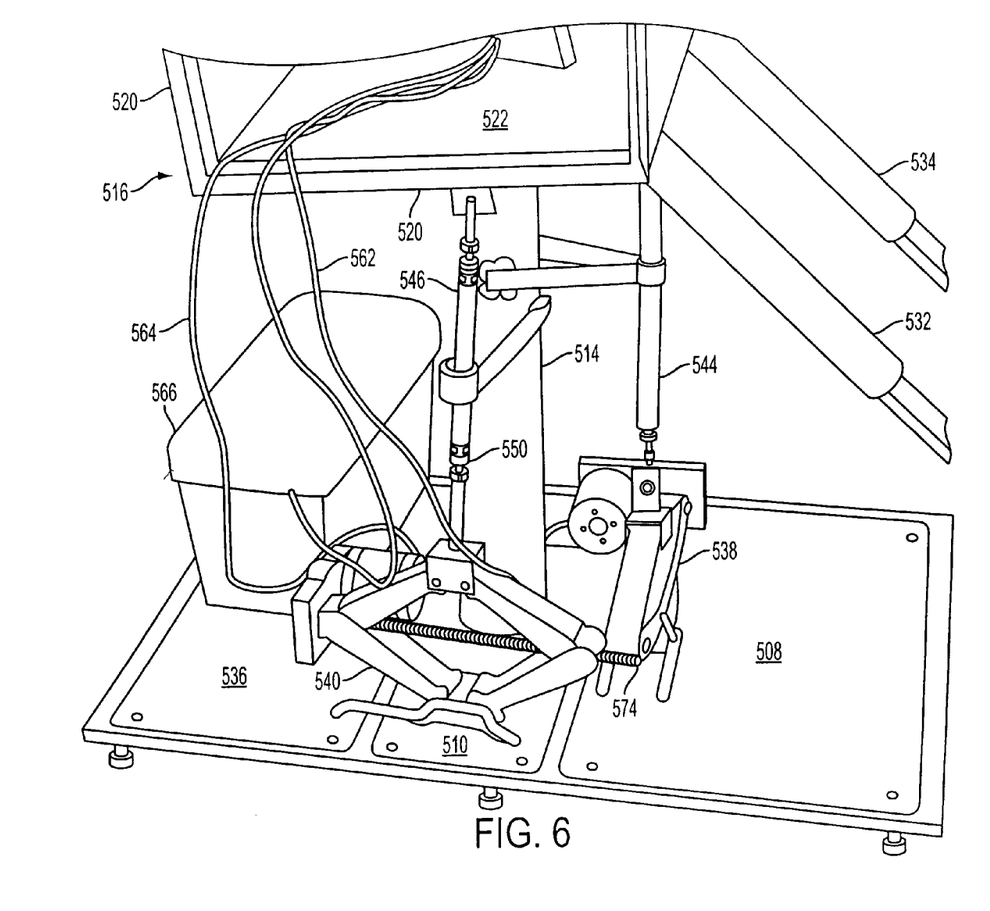
FIG. 6 shows a pedestal point of the motion simulating device of FIG. 5.

A pedestal point post 514 is supported on the pedestal point's first end by the pedestal point post support plate 512, and a user chair 516 is supported by the pedestal point post 514 on the pedestal point post's second end. A controller 560 is in communication with the first scissor jack 538 and the second scissor jack 540 through wires 562 and 564, respectively. More specifically, the controller is in communication with the first scissor jack motor 568 and the second scissor jack motor 570. Alternatively, the controller 560 can be in wireless communication with the scissor jacks.

The user chair 516 can include a seat 518 having a frame 520, a support section 522, a back 524 and armrests 526 and 528. Additionally, the user chair 516 can have a foot rest 530 connected to the frame 520 by foot rest support rods 532 and 534. The foot rest support rods 532 and 534 can be adjustable to accommodate differing sizes of legs of various users. Also, a single foot rest support rod can be used, which thereby lightens the overall weight of the motion simulating device.

Figure 7:
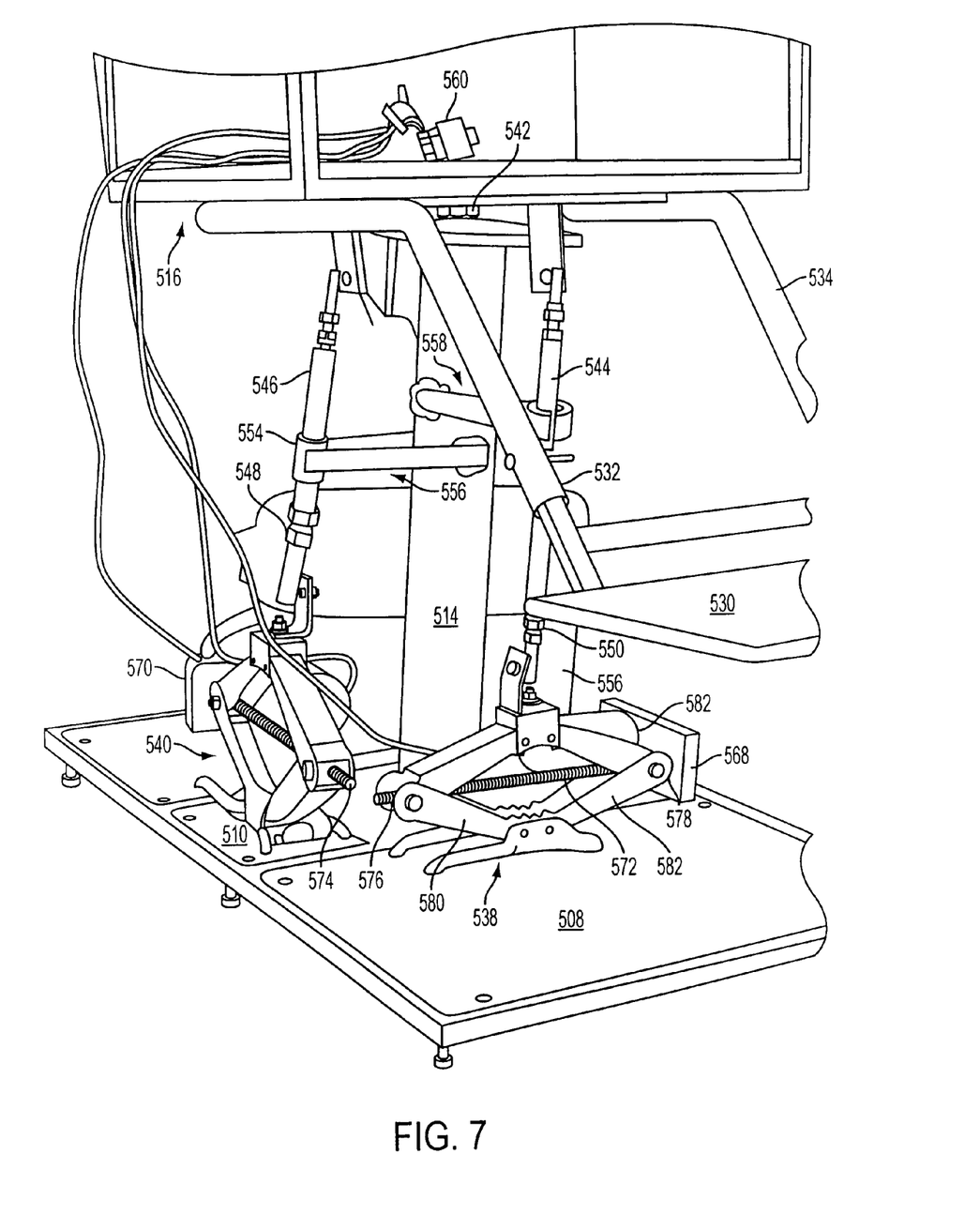
FIG. 7 shows a swivel joint positioned atop the pedestal point of the motion simulating device of FIG. 5.

With reference to FIG. 7, the pedestal point post 514 includes a swivel joint 542. The swivel joint 542 can be any of various types of joints such as a conventional ball and socket joint or a universal joint. The swivel joint 542 provides freedom of movement to the user chair 516 in three degrees of rotation. Thus, the user chair 516 is free to tilt forward and backward, side-to-side and the user chair 516 can revolve three-hundred and sixty degrees about the pedestal point post 514. The swivel joint 516 can be a ball mount, a clevis pin mount or a combination of a ball mount with a clevis pin. With either of these types of mounts, the chair is made raisable along the shaft of the ball mount stem or clevis pin, which allows for a jerking motion to be applied to the chair.

With further respect to FIG. 7, each of the scissor jacks 538 and 540 is connectable to either the user chair 516 or to the swivel joint 542. If the scissor jacks 538 and 540 are connected to the swivel joint 542, a rotating mechanism (not shown) can be placed atop the swivel joint and an additional motor can be associated with the rotating mechanism such that the chair can revolve while the base remains stationary. Thus, one of the advantages to connecting the scissor jacks 538 and 540 to the swivel joint 542 is the ability to rotate the user chair 516 three-hundred and sixty degrees about the pedestal point post 514.

Each of the scissor jacks is connectable to the user chair 516 or to the swivel joint 542 by tilting rods 544 and 546. As shown in FIG. 7, the first scissor jack 538 is connected to the user chair 516 by tilting rod 544. And the second scissor jack 540 is connected to the user chair 516 by the tilting rod 546. Both of the tilting rods 544 and 546 are adjustable using titling rod adjustment screws 548 and 550 (shown in FIG. 8). Additionally, as can be seen in FIGS. 7 and 9a, tilting rod guides 552 and 554 can be used to reduce the likelihood of damage from outside forces by encircling the tilting rods 544 and 546. As can be seen in FIGS. 9a and 9b, the tilting rod guides 552 and 554 are affixed to the pedestal point post 514 by tilting rod guide connecting mechanisms 556 and 558.

This embodiment of the motion simulating device operates by receiving an input signal by the controller 560 (shown in FIGS. 5 and 10) from a user. The input signal is split at the controller 560 and transmitted from the controller 560 to each of the scissor jacks motors 568 and 570. The scissor jack motors then translate the input signals received from the controller 560 into rotary mechanical motion.

Figure 8:
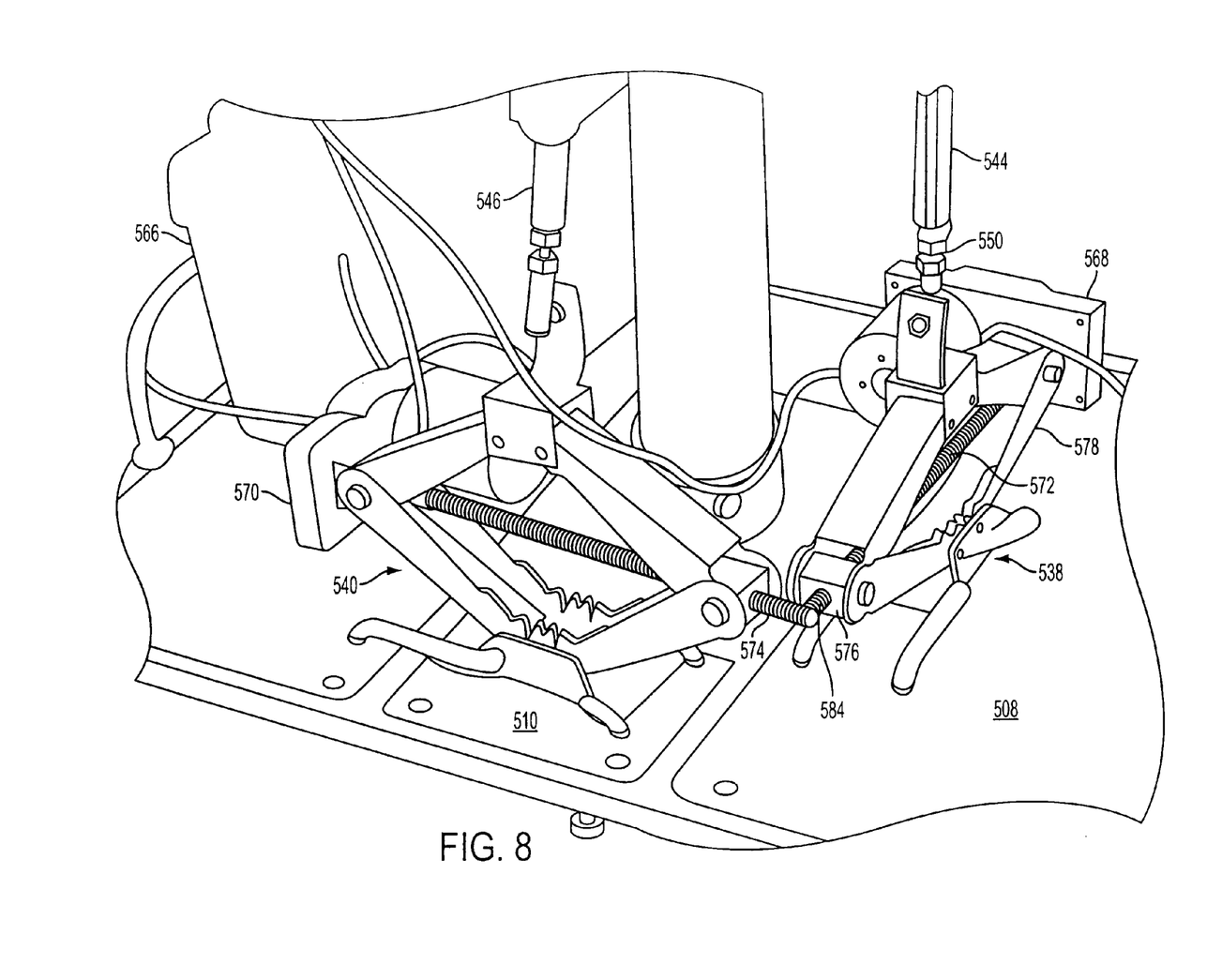
FIG. 8 shows the scissor jacks of the motion simulating device of FIG. 5.
Figure 9A:
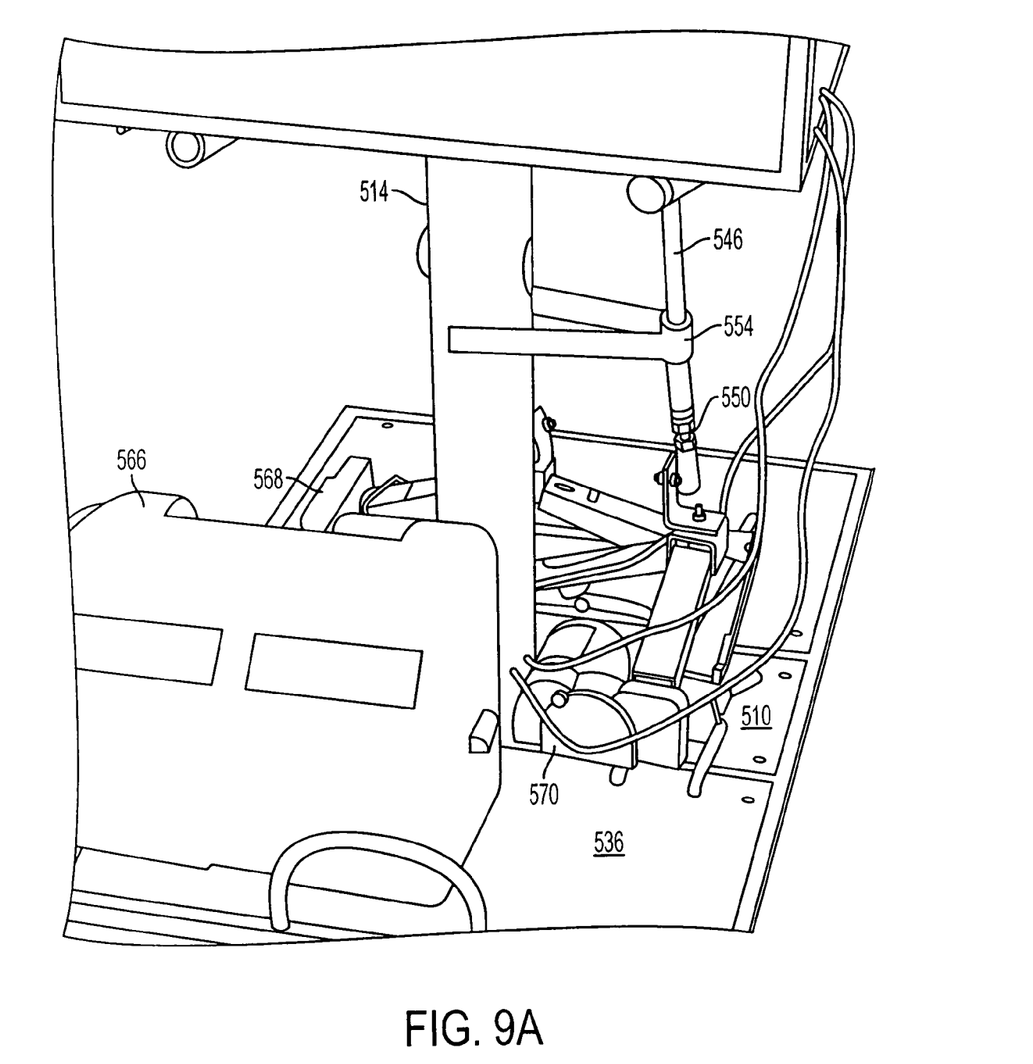
FIGS. 9a and 9b show a power supply for the motion simulating device of FIG. 5.
Figure 9B:
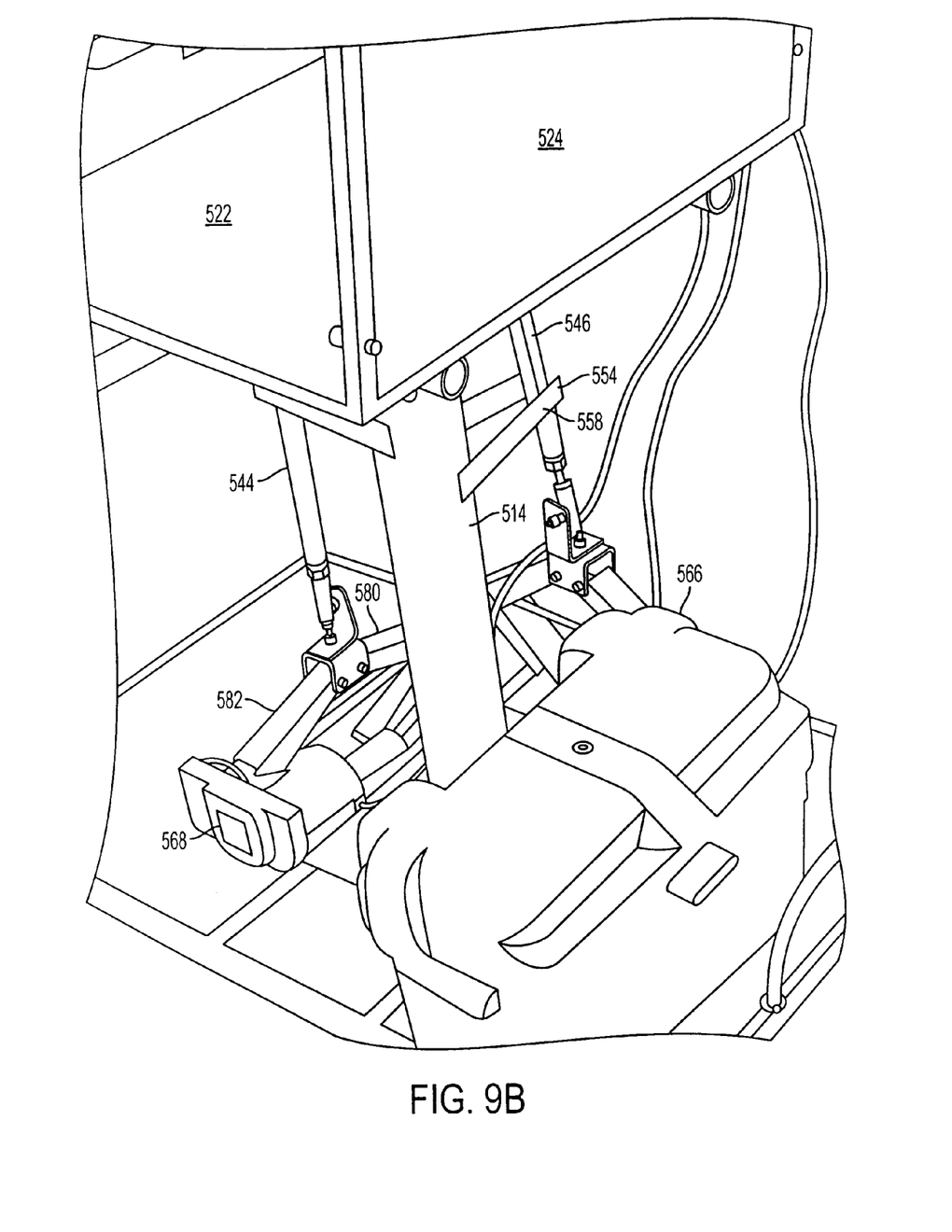
Figure 10:
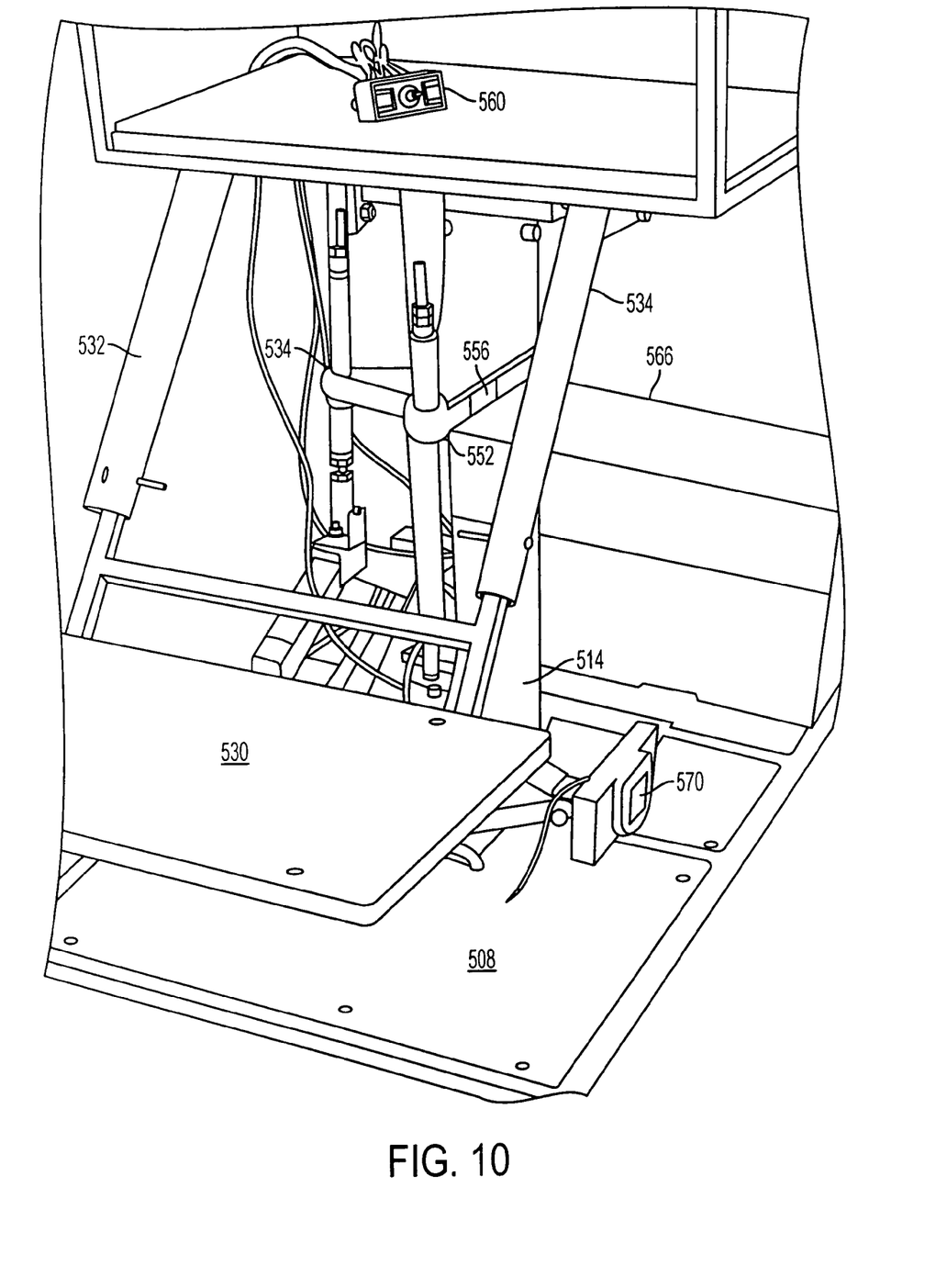
FIG. 10 shows a tilting rod and tilting rod guide of the motion simulating device of FIG. 5.

With reference to FIGS. 7 and 8, the scissor jack motors 568 and 570 are both connected to respective helical screws 572 and 574. Thus, the rotary mechanical movement of the scissor jack motors 568 and 570 rotate the helical screws 572 and 574, thereby raising or lowering the scissor jacks 538 and 540. For example, with respect to the first scissor jack 538, rotation of the helical screw 572 causes helical screw blocks 576 and 578 to move toward each other or away from each other thereby raising or lowering scissor jack arms 580 and

582. The motion of the blocks is due to the fact that block 576 has a threaded through-hole 584 that slides along helical screw 572. As a result of the motion of the scissor jack arms 580 and 582, the tilting rods 544 and 546 are projected upward or retracted downward, thereby pushing up on the user chair 516 or the swivel joint 542.

Any of the embodiments of the motion simulating device can be powered by a DC source 566 (shown in FIG. 9*b*), an AC source, a combination of an AC source with a DC backup or a combination of a DC source with an AC backup. With a combination of sources, a person can use the motion simulating device even during a power failure. For example if a battery loses all of its power, the AC source can continue to provide power to the device. Similarly, if the AC power supply is interrupted, a DC power source can continue to supply power to the device. Or, the motion simulating device can be powered independently of any attached entertainment system or the motion simulating device can draw power directly from an attached entertainment system.

Also, each of the embodiments of the motion simulating device does not necessarily have to be connected to a game or other entertainment system. The motion simulating device can stand alone such that it is responsive to input submitted by a user. For example, a person can operate the controller 560 to manipulate the scissor jacks without a display, a game system, and entertainment system, etc. The advantage to this is that the motion simulating device can be used as a lounge chair that can be adjusted to correspond to the preferences of the person sitting in the device; or, it can be used as simply as a means for providing random motion to a user. With particular importance to use of the motion simulating device as a lounge chair, each of the embodiments of the motion simulating device can be made to include a reclining back rest, adjustable headrests and armrests, and adjustable lumbar.

Additionally, each of the embodiments of the motion simulating device can be used in connection with a communications network such as the internet. Dedicated online networks can be set up on which multiple users of the present inventive device can interact with each other. Among other things, dedicated online networks can be used as a multi-player gaming system, a home theatre system, a video conferencing system, or vehicle training systems.

The presently claimed motion simulating device is not limited to the embodiments disclosed herein. For example, a person can experience motion in all three polar axis, which is advantageous in the situation where using a passenger compartment containing visual displays on all interior surfaces thereof. In this instance, using aeronautical terms, a person will want to be able to roll, pitch, and yaw, if so desired.

We claim:

1. A motion simulating device comprising:
   a first scissor jack having a first helical screw;
   a first motor that rotates said first helical screw thereby raising or lowering said first scissor jack;
   a second scissor jack having a second helical screw;
   a second motor that rotates said second helical screw thereby raising or lowering said second scissor jack;
   at least one base connected to said first scissor jack and connected to said second scissor jack; and
   a controller in communication with said first motor and said second motor so that rotation of said first helical screw raises or lowers said first scissor jack moving said at least one base and rotation of said second helical screw raises or lowers said second scissor jack moving said at least one base.

2. A motion simulating device as recited in claim 1 wherein said first motor and said second motor are both linear motors.

3. A motion simulating device as recited in claim 1 wherein said first motor and said second motor are both rotating motors.

4. A motion simulating device as recited in claim 1 further comprising at least one visual display connectable to said controller through a visual display connector.

5. A motion simulating device as recited in claim 4 wherein said controller further controls movement in a scene appearing on said at least one visual display.

6. A motion simulating device as recited in claim 1 further comprised of an adapter for making the motion simulating device connectable to a plurality of entertainment systems.

7. A motion simulating device as recited in claim 4 further comprised of a passenger compartment resting on top of said at least one base wherein said passenger compartment is movable in coordination with a scene appearing on said at least one visual display.

8. A motion simulating device as recited in claim 7 wherein said passenger compartment and said at least one visual display are enclosed with a cover such that said passenger compartment and said at least one visual display are visually sealed from outside light sources.

9. A motion simulating device as recited in claim 8 further comprised of an audio system including speakers positioned within said passenger compartment.

10. A motion simulating device as recited in claim 1 further comprising a plurality of bases wherein one of said plurality of bases is operable independently of a remainder of said plurality of bases.

11. A motion simulating device as recited in claim 1 wherein raising or lowering of said first scissor jack tilts said base about a first axis and raising or lowering of said second scissor jack tilts said base about a second axis.

12. A motion simulating device as recited in claim 4 wherein said first scissor jack continuously adjusts an angle of said base about said first axis and said second scissor jack continuously adjusts an angle of said base about said second axis so that said base is provided with motion in accordance with a viewpoint of a scene appearing on said at least one visual display.

13. A motion simulating device as recited in claim 1 wherein said controller is a steering wheel.

14. A motion simulating device as recited in claim 13 further including a second controller.

15. A method of simulating motion comprising:
   receiving an input in a controller, said input having a magnitude;
   transmitting a primary signal corresponding to said input from said controller to a processor;
   determining an amount of said magnitude of said input;
   dividing said signal corresponding to said input into a first secondary signal and a second secondary signal;
   sending said second secondary signal to a signal splitter, said signal splitter being connected to a first scissor jack and a second scissor jack;
   dividing said second secondary signal into a first tertiary signal and a second tertiary signal, whereby said first tertiary signal causes said first scissor jack to raise or lower and said second tertiary signal causes said second scissor jack to raise or lower;
   raising or lowering said first scissor jack in accord with said first tertiary signal; and
   raising or lowering said second scissor jack in accord with said second tertiary signal.

16. A method of simulating motion as recited in claim 15 further comprising the step of sending said first secondary signal to a display and providing a first update corresponding to said amount of said magnitude.

17. A method of simulating motion as recited in claim 16 further comprising the step of receiving an external input from an external system designed to send a second update to said display in a manner independent of said first update and providing a signal relating to said external input to said signal splitter.

18. A system for simulating motion comprising:
- a means for receiving an input in a controller, said input having a magnitude;
- a means for transmitting a primary signal corresponding to said input from said controller to a processor;
- a means for determining an amount of said magnitude of said input;
- a means for dividing said signal corresponding to said input into a first secondary signal and a second secondary signal;
- a means for dividing said second secondary signal into a first tertiary signal and a second tertiary signal, whereby said first tertiary signal causes said first scissor jack to raise or lower and said second tertiary signal causes said second scissor jack to raise or lower;
- a means for raising or lowering said first scissor jack in accord with said first tertiary signal; and
- a means for raising or lowering said second scissor jack in accord with said second tertiary signal.

19. A system for simulating motion as recited in claim 18 further comprising a means for sending said first secondary signal to a display and providing a first update to said display corresponding to said amount of said magnitude, and for sending said second secondary signal to a signal splitter, said signal splitter being connected to a first scissor jack and a second scissor jack.

20. A system for simulating motion as recited in claim 19 further comprising a means for receiving an external input from an external system designed to send a second update to said display in a manner independent of said first update and;
- a means for providing a signal relating to said external input to said signal splitter.

* * * * *